United States Patent [19]

Ledenican

[11] Patent Number: 4,818,641

[45] Date of Patent: Apr. 4, 1989

[54] CELL CIRCUIT INTERRUPTER

[75] Inventor: Alan J. Ledenican, Willowick, Ohio

[73] Assignee: Eveready Battery Company, St. Louis, Mo.

[21] Appl. No.: 177,241

[22] Filed: Apr. 4, 1988

[51] Int. Cl.[4] .............................................. H01M 2/34
[52] U.S. Cl. .......................................... 429/61; 429/66
[58] Field of Search ...................... 429/58, 61, 66, 174, 429/56

[56] References Cited

U.S. PATENT DOCUMENTS

| | | | |
|---|---|---|---|
| 2,651,669 | 9/1953 | Neumann | 136/182 |
| 3,081,366 | 3/1963 | Belove | 136/6 |
| 3,373,057 | 3/1968 | Jost | 136/6 |
| 3,431,528 | 3/1969 | Richard | 337/414 |
| 3,617,386 | 11/1971 | Bosben | 136/107 |
| 3,676,221 | 7/1972 | Bach | 136/111 |
| 3,775,661 | 11/1973 | Frezzolini | 320/46 |
| 3,939,011 | 2/1976 | Zaleski | 429/58 |
| 4,025,696 | 5/1977 | Tucholski | 426/61 |
| 4,028,478 | 6/1977 | Tucholski | 429/61 |
| 4,035,552 | 7/1977 | Epstein | 429/58 |
| 4,690,879 | 9/1987 | Huhndorff | 429/61 |
| 4,756,983 | 7/1988 | Tucholski | 429/61 |

Primary Examiner—Donald L. Walton
Attorney, Agent, or Firm—Robert W. Welsh

[57] ABSTRACT

The invention relates to a galvanic cell having a failsafe circuit interrupter means for electrically isolating one terminal of the cell from the cell's electrochemical system when the closed end of the container of the cell bulges beyond a predetermined amount.

11 Claims, 1 Drawing Sheet

CELL CIRCUIT INTERRUPTER

FIELD OF THE INVENTION

The invention relates to a galvanic cell and more specifically to a cylindrical galvanic cell having a failsafe circuit interruption means for electrically isolating one terminal of the cell from the cell's electrochemical system when the closed end of the cylindrical container bulges beyond a predetermined amount.

BACKGROUND OF THE INVENTION

Galvanic cells, such as alkaline cells, are generally designed to vent when the internal pressure exceeds a predetermined amount. When exposed to an abuse condition, such as being charged to an excessive degree the cell is designed to vent and allow gas to escape. Under certain abuse conditions, electrolyte entrained in the gas may be forced from the cell. It is preferable to have the electrolyte escape rather than have the cell rupture from internal pressure buildup.

Cell manufacturers have used a number of approaches to resolve the problem of expelling electrolyte during venting. One of the most common methods of preventing seal rupture due to abuse charging or the like is to insert a diode in the battery's electrical circuit. By eliminating the possibility of charging the cells, internal gas is not generated and the seal never ruptures. Another electrically related mechanism is a belleville shaped "flip switch". This device is triggered by bulging of the closed end of the cell's cylindrical container which causes a washer to invert and thereby break electrical contact. Another method involves the use of absorbents or electrolyte thickeners. The absorbent materials are usually located outside the seal area and beneath the cell's cover or jacket. As electrolyte escapes from a ruptured seal, the liquid is absorbed. Spew thickeners are mixed with the electrolyte and therefore are contained within the cell. The objective of the thickener is to slow down and/or absorb any leakage that may occur. The disadvantage of using either an absorbent or a thickener is that both materials tie up space that otherwise could be used for active materials of the cell. A third procedure is to use an outer container and end covers as an electrolyte containment system to provide space to contain the electrolyte that may escape.

U.S. Pat. No. 3,676,221 discloses a battery comprising a plurality of stacked, disk like sealed cells secured together by cups fitted over one cell and having bottoms spot-welded to the next cell and sidewalls spot-welded to the interfitting cell. A heat-shrunk sheath encloses the battery and has caps forming the poles. Between each pair of cells is a circular disc of insulating material against which the cup bottoms bulge upon expansion of the contents of the cells, thereby breaking the welds and electrically disconnecting the cells.

U.S. Pat. No. 4,025,696 describes a disk shaped washer which inverts after the bottom bulge exceeds a predetermined value. Prior to activation, the washer's inside diameter is slanted toward the container. As the container bulges, the bottom of the container pushes against the washer and eventually causes the washer to invert. This inversion electrically separates the bottom cover from the container. An open circuit is the net result.

U.S. Pat. No. 3,775,661 describes a cell in which internal pressure forces a diaphragm against a switch which electrically disconnects a charging device. The diaphragm is located inside a venting device which is attached to one end of the cell.

U.S. Pat. No. 2,651,669 describes a bulge activated switch that can be incorporated into a single cell battery or a multiple cell battery and operable such that the bulge can be used to open a switch or switches that control the cell's discharging and/or charging circuits.

U.S. Pat. No. 3,617,386 describes a cell in which a thin sheet of metal with "spring back" ability is positioned between the seal and cover of the cell so as to break the cell's electrical circuit when the bulge becomes excessive.

U.S. Pat. No. 3,081,366 describes a sealed cell having a metallic sheet member connected to one cell electrode and its periphery insulatingly affixed to an open casing end and an overlying exposed metallic terminal insulatingly held over the sheet member. A movable switch portion normally connects an intermediate pressure-deflectable sheet member portion to the external terminal and, in response to outward motion of the deflected sheet portion under excess internal pressure the switch portion disconnects the external terminal from the deflected sheet portion.

U.S. Pat. No. 3,373,057 describes a cell in which the cover of the casing of the cell is provided centrally with an inwardly concave-contact button. A dished (which is to say concaveconvex) snap-acting spring disc of the automatic reset type is marginally sealed to the inside of the cover. An automatic reset disc after snapping in one direction in response to pressure on its convex side will return with snap action when the pressure is relieved. The disc is provided centrally with a sealed movable contact for engagement and disengagement with an internal fixed contact when the disc snaps to and fro. The arrangement is such that when the contacts are engaged the disc is slightly sprung toward the cover but short of causing snap action This maintains good electrical contact pressure under safe internal gas pressures. The fixed contact is electrically connected with one set of battery plates and the other set of plates is electrically connected with the casing.

U.S. Pat. No. 4,690,879 describes a cylindrical galvanic cell employing a unitary type cover as a failsafe circuit interruption means for electrically isolating one terminal of the cell from the cell's electrochemical system when the bottom of the cylindrical cell bulges beyond a predetermined amount so that the unitary cover breaks electrical contact with the housing of the cell.

It is therefore an object of this invention to provide a galvanic cell with means for electrically isolating one terminal of the cell from the cell's electrochemical system upon reaching a predetermined bulge in the cell's housing.

Another object of this invention is to provide means for electrically isolating one terminal of a galvanic cell from the cell's electrochemical system upon reaching a predetermined bulge in the cell's housing and that will occupy a minimum space requirement so as not to diminish the space allocated for the active components of the cell.

Another object of this invention is to provide a sealed galvanic cell with means for electrically isolating one terminal of the cell from the electrochemical system of the cell upon reaching a predetermined bulge in the cell's housing and that is easy to make, cost effective and easy to assemble.

The foregoing and additional objects will become more fully apparent from the following description and the accompanying drawing.

SUMMARY OF THE INVENTION

The invention relates to a sealed galvanic cell comprising a conductive container open at one end and closed at the opposite end and including in said container a positive electrode, a negative electrode and an electrolyte, with said container being in electrical contact with one of said electrodes; a cover mounted over said open end of said conductive container, said cover being secured to and electrically insulated from said conductive container and in electrical contact with the other electrode; an insulating member comprising a flat disc having an upwardly extending peripheral flange and the circumference of said insulating member being smaller than the circumference of the closed end of said conductive container, said insulating member disposed at the central exposed area of the closed end of the container with the peripheral flange extending outward and with the peripheral area of the closed end of the container being exposed; a conductive member disposed within the flange and seated on the outer surface of said insulating member; an annular conductive member disposed and secured to the exposed peripheral area of the closed end of the container and extending over the upstanding flange of the insulating member and electrically contacting the conductive member thereby adapting the conductive member as the terminal for the electrode in electrical contact with said conductive container; and wherein the central area of the closed end of the container upon bulging a predetermined amount will force the insulating member away from the closed end of the container whereupon the outward extending flange will push against the annular conductive member and thereby electrically isolate the conductive member from the electrode in electrical contact with the conductive container.

The conductive member could be designed with a hat shaped appearance so that the dome of the hat would extend from the closed end of the conductive container while the flange portion would seat within and be secured in the insulating member. In this configuration, the dome would be like the conventional shaped terminal that is employed with commercial cells. If desired the conductive member could be secured within the insulating member by friction, adhesive or by any other securing means. The insulating member could be secured to the central area of the closed end of the container by using a suitable adhesive or other securing means.

The outer peripheral area of the annular conductive member can be secured to the outer peripheral area of the closed end of the conductive container using a conductive adhesive, welding or any other suitable securing means. Generally the annular conductive member should be rigid and comprise a flat outer peripheral area segment suitable to be secured to the peripheral area of the closed end of the conductive container, an extended flange type segment extending from said flat outer section and being sufficient in height so that it exceeds the height of the flange of the insulating member, and terminating in a centrally extending segment that is sufficient to electrically contact the conductive member. When using a hat shaped conductive member, the opening at the center of the annular conductive member should be at least larger than the diameter of the dome portion of the conductive member. The height of the flange of the insulating member, the contour of the annular conductive member and the shape of the centrally disposed conductive member can all be varied to produce an overall assembly that coacts to electrically isolate the central conductive terminal upon a predetermined bulge in the closed end of the conductive container. If the rim height of the insulating member is selected as the activation control variable, then the height of the rim could be selected to allow a space between the upper face of the rim and the annular conductive member so that a tolerable bulge of the closed end of the container could occur before the circuit interrupter means is activated. Conversely, the rim height of the insulating member could be selected so that the circuit interrupter would electrically isolate the central conductive terminal from the conductive container at a relatively low bulge value.

The insulating member could be designed with a depression or cavity at the center of its bottom surface facing the closed end of the conductive container so that any initial small bulge of the closed end of the conductive container could be accommodated in such cavity without interrupting or isolating the central terminal from the conductive container. For example, a depression or cavity in the underside of the insulating member that is narrow and shallow will cause the circuit interrupter to activate at a fairly low bulge value while a depression or cavity that is broad and deep will cause the circuit interrupter to activate at a fairly high bulge value. Thus the bulge value at which the circuit interrupter activates can be easily and reliability preset.

To maintain the electrical contact between the peripheral segment of the annular conductive member and the external peripheral area of the closed end of the conductive container, the peripheral segment could be welded to the peripheral area of the closed end of the conductive container using one or more welds or by using a suitable electrically conductive adhesive. Examples of suitable conductive adhesives would include: acrylic type adhesives, epoxy type adhesives and cyanoacrylate type adhesives that have been mixed with an electrical conductor such as silver or graphite. It is important that the peripheral segment of the annular conductive member remain in good securement when the closed end of the container bulges so that the rigid annular member can be forced outward by the flange of the insulating member.

In the preferred embodiment of the invention, the conductive container would be a cylindrical container, the central conductive member would be a hat shaped terminal, the insulating member would be a dish-shaped member with an upward extended peripheral flange and the annular conductive member would be a rigid member terminating with a downwardly extending flange to electrically contact the central conductive member. The peripheral segment of the annular conductive member could be secured to the closed end of the container by at least one weld. The three parts that comprises the circuit interrupter are easy to manufacture. In the operational mode, the bulge of the closed end of the conductive container will push against the insulating member thereby forcing the flange of the insulating member against the annular conductive member. The annular conductive member in turn is forced outward away from the closed end of the container thereby breaking electrical contact with the central conductive terminal. This effectively isolates the central terminal from being in electrical contact with the cell's active components.

The subject invention will effectively eliminate electrolyte leakage due to abusive charging or overdischarging, does not require an additional electrical component, is relatively simple to incorporate into a manufacturing process, and generally does not take up any space normally devoted for the active materials. In the preferred embodiment, two or more welds between the peripheral segment of the annular member and the peripheral area of the closed end of the conductive container will be suitable to insure proper securement therebetween.

The simple design of the circuit interrupter means of this invention provides a number of unique features. The circuit interrupter means can be incorporated into most cell constructions. The circuit interrupter means is generally irreversible such that the electrical connection between the cover and container is kept intact until the closed end of the container bulges beyond a predetermined amount. The circuit interrupter means of this invention is inexpensive since there are no costly mechanical parts to purchase.

In some applications the control of the degree of bulge required to activate the circuit interrupter is critical. The circuit interrupter should not be activated by an amount of bulge that normally would occur when the cell is subject to high temperature storage. Thus the degree of bulge must be beyond the normal bulge that can be encountered in high temperature storage but below the degree of bulge caused by pressure buildup which will activate the vent and allow electrolyte to escape. For example, in a standard type alkaline D size cylindrical cell (2.277 inches high and 1.318 inches diameter), the bottom of the container can bulge as much as 0.025 inch when stored at 71° C. for an eight (8) week period and can vent when the bulge exceeds 0.070 inch. Consequently, for this size and type cell system, the central portion should generally be designed to activate the circuit interrupter when the bulge is between about 0.030 and about 0.070 inch.

This invention is ideally suited for alkaline cells employing an $MnO_2$ positive electrode, a zinc negative electrode and an electrolyte solution comprising potassium hydroxide.

The present invention will become more apparent from the following description thereof when considered together with the accompanying drawing which is set forth as being exemplary of the present invention and is not intended to be limitative thereof in any respect.

Figure 1:
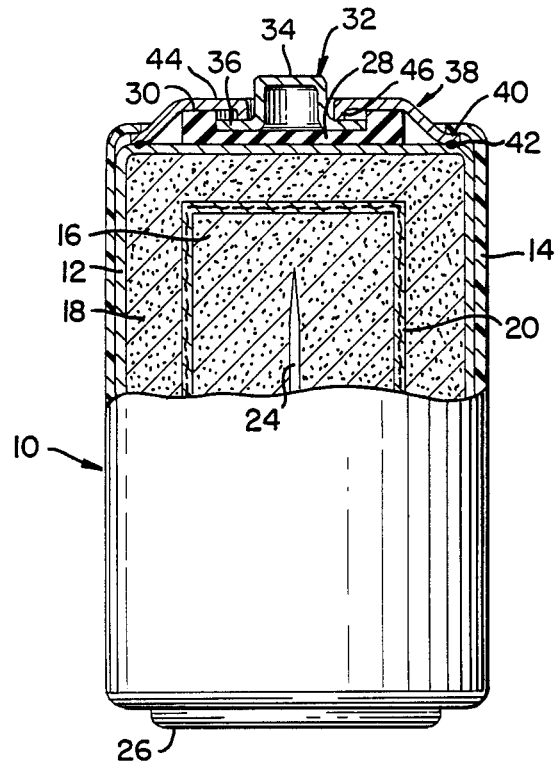
FIG. 1 is an elevational view partially in cross-section of an alkaline manganese dioxide zinc cell embodying a circuit interrupter means of the present invention.
Figure 2:
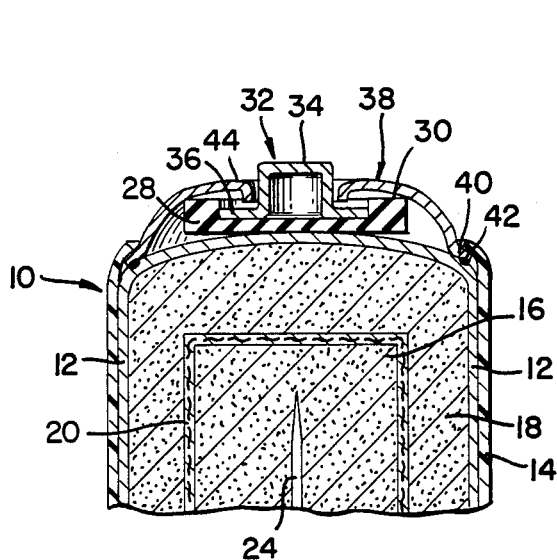
FIG. 2 is an elevational view of part of the cell in FIG. 1 showing the inner segment of the conductive annular member separated and not in contact with the central conductive terminal of the cell.

Referring now to the drawing and particularly to FIGS. 1 and 2 inclusive in which a typical alkaline galvanic cell 10 of the present invention is shown comprising an inverted metallic cupped container 12 provided with an outer plastic shrink label 14. Disposed within the container 12 is an anode 16, a cathode 18, a separator 20 and an alkaline electrolyte which permeates the anode 16, cathode 18, and separator 20 respectively. An anode current pin type collector 24 extends lengthwise within the cell 10, parallel to the longitudinal axis of the cell, from a location in contact with the anode 16 to the negative end 26 of the cell 10 where it terminates.

A rigid nonconductive or insulating disc 28 having an upward extending annular flange 30 is shown contacting the inner exposed area of the closed end of container 10. A hat shaped conductive cover or terminal 32 comprising a dome 34 extending with peripheral flange 36 is shown seated within insulating disc 28. A conductive annulus member 38 is shown with its peripheral segment 40 welded at 42 to the peripheral area of the closed end of container 10. The inner segment 44 of annulus member 38 extends upward to the height of flange 30 of insulating disc 28 and then extends inward with a downward flange 46. As shown in FIG. 1, annular member 38 is in electrical contact with and secured to conductive container 10 at its peripheral segment while its internal segment denoted by flange 46 is in electrical contact with the central terminal 32. Thus terminal 32 acts as the terminal of the cell that is in electrical contact with the conductive container.

As shown in FIG. 2, after a predetermined amount of bulge occurs in the closed end of the container, the rigid insulating disc 28 is forced outward where its flange 30 pushes against the inner segment 44 of conductive annulus member 38. With the peripheral segment 40 of annulus member 38 secured to the closed end of container 10, the inner segment 44 is made to pivot about the welded area 42 and thereby break the electrical contact with central terminal 32. This electrically isolates central terminal 32 from conductive container 10. By designing the insulating member 28, annulus member 38 and central terminal 32 as to size, material and configuration, this invention can effectively isolate the central terminal 32 from the circuit of the cell prior to the cell venting or rupturing.

Figure 3:
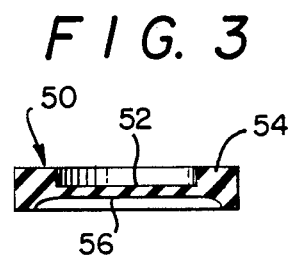
FIG. 3 is a cross-sectional view of an insulating dish-shaped member suitable for use in this invention.

FIG. 3 shows another embodiment of an insulating member 50 composed of an inner disc 52 terminating with an extending flange 54 which extends above and below the inner disc 52. The cavity or depression 56 disposed at the undersurface of the insulating member 50 is designed to accommodate a degree of bulge at the closed end of the container without forcing or pushing the insulating member 50 outward. This type of insulating member 50 is suitable for those type of cells that normally have a fair degree of tolerable bulge that does not effect the operation of the cell.

Figure 4:
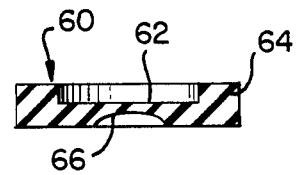
FIG. 4 is a cross-sectional view of another embodiment of an insulating dish-shaped member suitable for use in this invention.

FIG. 4 shows another embodiment of an insulating member 60 composed of an inner disc 62 terminating in an upward flange 64. On the underside of member 60 a small cavity or depression 66 is shown. This cavity or depression 66 is designed to accommodate a slight degree of bulge at the closed end of the container before activating the circuit interrupter. This type of insulating member 60 is suitable for those type of cells that can only tolerate a slight degree of bulge before affecting the operation of the cell for a particular intended use.

Although the present invention has been described with reference to particular details, it is not intended that these details shall be construed as limiting the scope of this invention.

What is claimed:

1. A galvanic cell comprising a conductive container open at one end and closed at the opposite end and including in said container a positive electrode, a negative electrode and an electrolyte, and said container being in electrical contact with one of said electrodes; a cover mounted over said conductive container, said cover being secured to and electrically insulated from said conductive container and in electrical contact with the other electrode; an insulating member comprising a flat disc having an upwardly extending peripheral flange with the circumference of said insulating member being smaller than the circumference of the closed end of said conductive container, said insulating member disposed at the central exposed area of the closed end of the container with the peripheral flange extending outward and with the peripheral area of the closed end of the container being exposed; a terminal conductive member disposed within the flange and seated on the outer surface of said insulating member; an annular conductive member disposed and secured to the exposed peripheral area of the closed end of the container and extending over the upstanding flange of the insulating member and electrically contacting the terminal conductive member thereby adapting the terminal conductive member as the terminal for the electrode in electrical contact with said conducting container; and wherein the central area of the closed end of the conductive container upon bulging a predetermined amount will force the insulating member away from the closed and of the container whereupon the outward extending flange will push against the annular conductive member and thereby electrically isolate the terminal conductive member from the electrode in electrical contact with the conductive container.

2. The galvanic cell of claim 1 wherein the undersurface of said insulating member has a cavity. adapted to accommodate an initial bulge of the closed end of the conductive container before forcing the flange of said insulating member away from the closed end of the conductive container.

3. The galvanic cell of claim 1 wherein said annular conductive member is secured to the exposed peripheral area of the closed end of the conductive container by at least one weld.

4. The galvanic cell of claim 1 wherein said annular conductive member is secured to the exposed peripheral area of the closed end of the conductive container with a conductive adhesive.

5. The galvanic cell of claim 4 wherein the conductive adhesive is selected from the group consisting of acrylic adhesive, epoxy adhesive and cyanoacrylate adhesive which have been mixed with an electrical conductor of silver or graphite.

6. The galvanic cell of claim 1 wherein said conductive member is hat-shaped.

7. The galvanic cell of claim 1 wherein said container is a cylindrical container and the central portion of said terminal conductive member acts as a terminal for the cell.

8. The galvanic cell of claim 1 wherein said container is in electrical contact with said positive electrode and said cover electrically insulated from the container is in electrical contact with said negative electrode.

9. The galvanic cell of claim 1 wherein said container is in electrical contact with said negative electrode and said cover electrically insulated from the container is in electrical contact with said positive electrode.

10. The galvanic cell of claim 1 where said positive electrode is $MnO_2$, said negative electrode is zinc and said electrolyte solution comprises potassium hydroxide.

11. The galvanic cell of claim 10 wherein the container is in electrical contact with said positive electrode and said cover electrically insulated from the container is in electrical contact with said negative electrode.